United States Patent [19]
Watanabe

[11] 3,894,896
[45] July 15, 1975

[54] PROCESS FOR MANUFACTURING A BODY OF MOISTURE-PROOF CONTAINER FOR PACKAGING

[75] Inventor: Tetsuo Watanabe, Tokyo, Japan

[73] Assignee: Dai Nippon Printing Co., Ltd., Tokyo, Japan

[22] Filed: Sept. 28, 1973

[21] Appl. No.: 401,608

[30] Foreign Application Priority Data
Sept. 29, 1972 Japan............ 47-97813

[52] U.S. Cl. ............... 156/69; 156/211; 156/212; 156/224; 156/229; 156/268; 206/538
[51] Int. Cl. ............ B29c 27/10; B29c 27/12
[58] Field of Search .......... 156/210, 211, 212, 224, 156/229, 245, 253, 268, 285, 292, 309, 69; 206/42, 437, 538; 229/3.5 MF; 161/69, 113, 119, 120, 127, 131

[56] References Cited
UNITED STATES PATENTS

| | | | |
|---|---|---|---|
| 2,618,381 | 11/1952 | Gilbert.................... | 156/211 |
| 3,145,112 | 8/1964 | Boegershausen............ | 229/3.5 MF |
| 3,311,229 | 3/1967 | Troll et al................ | 206/437 |
| 3,331,495 | 7/1967 | Leckzik et al.............. | 206/42 |
| 3,504,788 | 4/1970 | Gray..................... | 206/42 |
| 3,645,822 | 2/1972 | Widiger et al.............. | 156/309 |
| 3,674,109 | 7/1972 | Murase................... | 156/253 |
| 3,684,610 | 8/1972 | Frielingsdorf et al......... | 156/309 |
| 3,778,323 | 12/1973 | Posner................... | 156/285 |
| 3,780,856 | 12/1973 | Braverman................ | 206/42 |
| 3,811,564 | 5/1974 | Braber................... | 206/42 |

Primary Examiner—Charles E. Van Horn
Assistant Examiner—Basil J. Lewris
Attorney, Agent, or Firm—Stewart and Kolasch, Ltd.

[57] ABSTRACT

A process for manufacturing a body of a moisture-proof container having two or more recesses for packaging the characterized in that a metal foil is adhered to a thermoplastic resin film with a hot melt type adhesive to form a laminated sheet wherein only the metal foil of the laminated sheet is cut to form two or more blank portions having a form corresponding to the contents and the blank portions of the laminated sheet are stretch-formed by using a forming mould comprising two or more punches and a corresponding die at a temperature at which the hot melt type adhesive and the thermoplastic resin film are softened.

14 Claims, 8 Drawing Figures

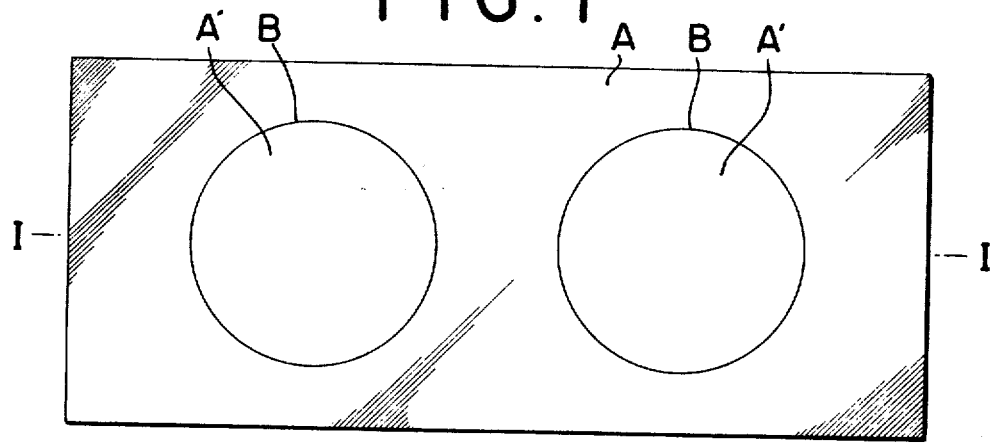
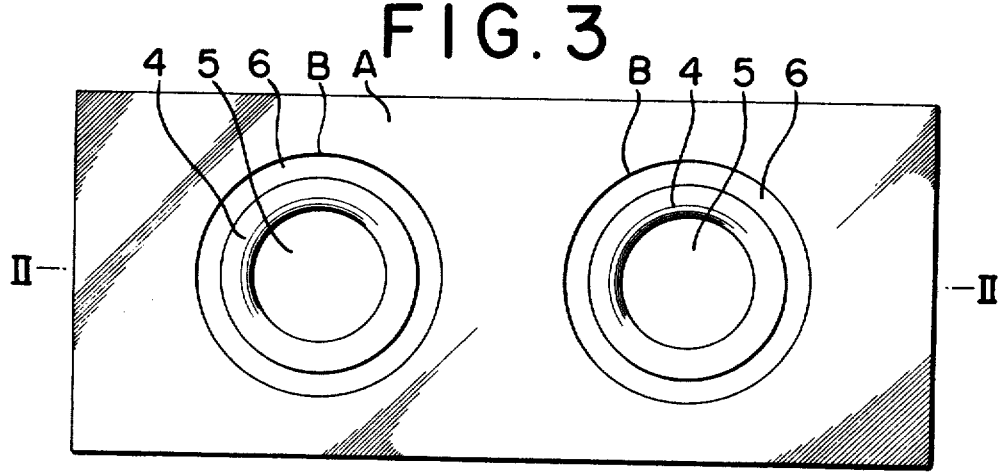
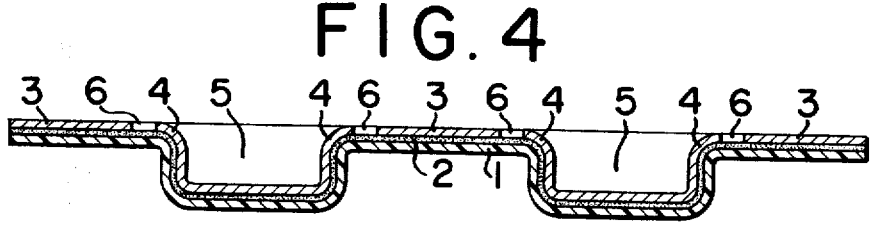

PROCESS FOR MANUFACTURING A BODY OF MOISTURE-PROOF CONTAINER FOR PACKAGING

The present invention relates to a process for manufacturing a body of a moisture-proof container for packaging and more particularly to a process for manufacturing a body of a moisture-proof container having two or more recesses for packaging the contents from a laminated sheet which is made by adhering a metal foil to a thermoplastic resin film with a hot melt type adhesive.

Recently, the requirements for a very high moisture-proof container for packaging has been gradually increased in order to package medical tablets, foods, superfine machine parts and various goods which must avoid moisture.

The manufacturing of the body of a moisture-proof container having only one recess for packaging contents has hitherto almost never been carried out except in an extraordinary case. However, the body of a moisture-proof container having two or more, especially many recesses for packaging contents has been generally manufactured.

In the prior process for manufacturing a body of a moisture-proof container, generally, a thermoplastic resin film having a moisture-proofness property, for example, polyvinylidene chloride film alone, or a thermoplastic resin film which is endowed with a moisture-proofness, for example, a polyvinyl chloride film covered with polyvinylidene chloride in the form of a coat or film is softened by heating and thereafter the softened film is pressure-formed or vacuum-formed to obtain a body of a moisture-proof container having two or more recesses for packaging the contents thereof.

These prior processes are a kind of stretch forming and are therefore well applicable to such material which can be elongated by 100 to 200 percent or more by a heating and softening, as for example, a thermoplastic resin film.

However, it has been considered to be quite impossible to manufacture the body of a moisture-proof container having two or more recesses for packaging the contents by using the laminated sheet made by adhering a thermoplastic resin film and a metal foil by a conventional forming methods, because the metal foil breaks in the course of the forming process.

The reason why said body cannot be manufactured in a conventional forming method is due to the fact that the elongation percentage of the material to be formed at the forming step is required to be 100 percent or more, but the maximum elongation percentage of the metal foil is about 20 to 30 percent even when it is heated. Consequently the metal foil is broken in the forming step.

The object of the present invention is to provide a process for manufacturing a body of a container having two or more recesses for packaging its contents by using a laminated sheet made by adhering a thermoplastic resin film and a metal foil without breaking the metal foil.

The feature of the present invention is a process for manufacturing a body of a moisture-proof container having two or more recesses for packaging its contents characterized in that a metal foil is adhered on a thermoplastic resin film with a hot melt type adhesive to form a laminated sheet wherein only the metal foil of the laminated sheet is cut to form two or more blank portions having a form corresponding to its contents and the blank portions of the laminated sheet are stretch-formed by using a forming mould comprising two or more punches and a corresponding die at a temperature at which the hot melt type adhesive and the thermoplastic resin film are softened.

According to the above process, the circumference of the blank portion of the metal foil can be stretch-formed toward the center of the die as the forming progresses, because the hot melt type adhesive is softened and the softened adhesive layer serves as a lubricant and also the circumference of the blank portion has been already cut. Therefore, the blank portion can be stretch-formed without breaking the metal foil.

Examples of the thermoplastic resin film which may be used in the process of the present invention include a film of polyvinyl chloride, polyethylene, polypropylene, a polyester or a polycarbonate. The preferable thermoplastic resin film is polyvinyl chloride film. The thickness of the thermoplastic resin film is 100 to 500 $\mu$, preferably 150 to 300 $\mu$, very preferably 150 to 200 $\mu$.

Examples of the metal foil which may be used in the process of the present invention include a foil of aluminum, tin, copper or iron. The preferable metal foil is a aluminum foil. The preferable thickness of the metal foil is 30 to 150 $\mu$, preferably 40 to 70 $\mu$.

The hot melt type adhesive which may be used in the process of the present invention is one wherein ethylene-vinyl acetate copolymer, polyvinyl acetate, polyvinylbutyral, polyethylene or a polyamide as the main component is added to rosin, an ester gum or a paraffin as an additive thereof. The thickness of the hot melt type adhesive is 3 – 30 $\mu$, preferably 10 to 15 $\mu$.

The manufacturing of the body of moisture-proof container having two recesses for packaging its contents according to the present invention is illustrated in detail with reference to the drawings.

In the drawing:

FIG. 1 is a plan view of one embodiment of a laminated sheet which may be used in the process of the present invention;

FIG. 2 is a sectional view taken on line I — I of FIG. 1;

FIG. 3 is a plan view of a body of a moisture-proof container having two recesses for packaging its contents which is obtained after the forming of the above laminated sheet;

FIG. 4 is a sectional view taken on line II — II of FIG. 3;

Referring to FIG. 1, A is a laminated sheet which shows the state before stretch-forming and in which a thermoplastic resin film 1 is adhered with a metal foil 3 with a hot melt type adhesive 2 and two blank portions A' and A" are formed by cutting only the metal foil 3 as shown in line B in FIG. 2.

In FIGS. 3 and 4, A is the body of a moisture-proof container for the packaging which is obtained by stretch-forming as shown in FIGS. 1 and 2, 1 being a thermoplastic resin film, 2 a hot melt type adhesive, 3 a metal foil, 4 a flange portion, 5 a recess for packaging the contents, 6 a gap which is created by the moving of the circumferences of two blank portions A' and A" (FIG. 1) of the metal foil 3 at the time of the stretch-forming and B the cut line of the metal foil 3.

In the following, the operation for stretch-forming the body of a moisture-proof container having two recesses for packaging the contents shown in FIGS. 3 and 4 from the laminated sheet shown in FIGS. 1 and 2 is illustrated with reference to FIGS. 5 and 6 in which the portion of the punch and die of the stretch-forming machine comprising two punches and the corresponding die is mainly shown.

Figure 5:
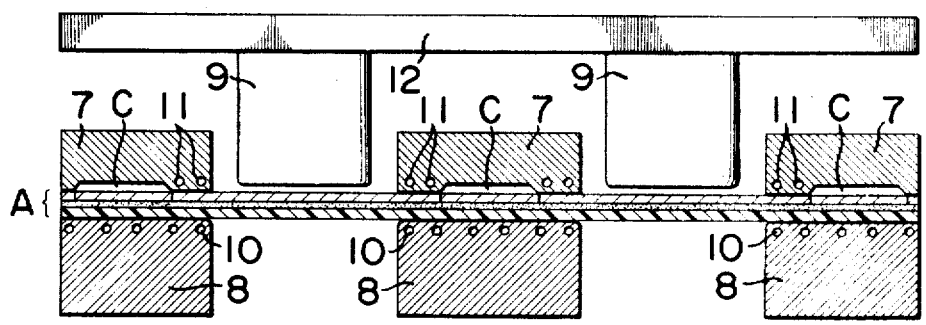
FIG. 5 is a sectional view of a stretch-forming machine which shows mainly two punches and the corresponding die and the state of the laminated sheet shown in FIGS. 1 and 2 before the stretch-forming.
Figure 6:
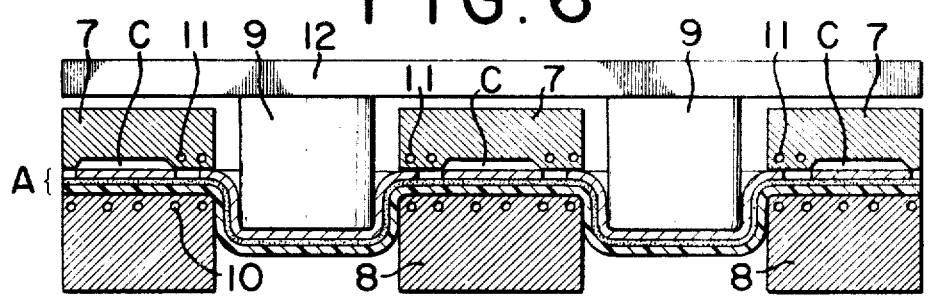
FIG. 6 is a sectional view of the stretch forming machine which shows mainly two punches and the corresponding die, and the condition of the laminated sheet after the stretch forming.

In FIGS. 5 and 6, A is a laminated sheet, 7 a blank holder for preventing the occurrence of the flange wrinkle, 8 a die, 9 a punch, 10 a cooling device which is provided in the die 8, 11 a heating device which is provided in the blank holder 7 and 12 a plate for supporting the punch 9. C is a shallow recess which is provided at the under part of the blank holder 7 in order to facilitate the stretch-forming.

In the practice of the operation, the laminated sheet A is placed on the die 8 which is cooled by the cooling device 10 and the blank portions A' and A" of said laminated sheet are placed so as to be position under the punches 9 and 9, which are attached to the punch supporting plate 12. Then the laminated sheet is supported between the die 8 and a blank holder 7 which is heated by the heating device 11 and prevents the occurrence of a flange wrinkle. In this case, the forming temperature is a temperature at which the hot melt type adhesive 2 and the thermoplastic resin film 1 can be softened.

As shown in FIG. 6, the punches 9 and 9 which are attached to a plate for supporting the punches 9 and 9 are then lowered to the blank portions A' and A" of the laminated sheet A and stretch-formed. Thereafter, the punches 9 and 9 are pulled up and then the body of moisture-proof container having two recesses for packaging contents is withdrawn after the hot melt type adhesive 2 is solidified.

Figure 7:
FIG. 7 is a sectional view of other embodiment of a laminated sheet which may be used in the process of the present invention.

According to the present invention, the laminated sheet as shown in FIG. 7 can be used in place of the laminated sheet as described beforehand.

In FIG. 7, 1 and 1' show a thermoplastic resin film, 2 a hot melt type adhesive, 3 a metal foil, 13 a normal adhesive and B a cutting line for making a blank portion. In the case of the laminated sheet, there is an advantage that the metal foil 3 can be strengthened in and/or after the stretch-forming operation because the thermoplastic resin film 1 is adhered with the metal foil 3.

Figure 8:
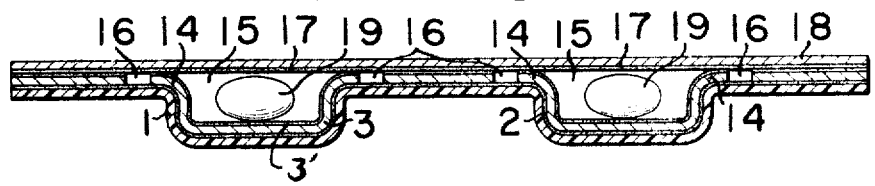
FIG. 8 is a sectional view of a container which is made by using the body of a moisture-proof container having two recesses according to the present invention and which includes the contents.

In order to make a complete container by using the body of a moisture-proof container for packaging, which is obtained by the process of the present invention, for example, a sheet having a moisture-proofness in which a metal foil is coated with a heat-sealable adhesive is adhered to said body of moisture-proof container for packaging as shown in FIG. 8. In FIG. 8, 1 is a thermoplastic resin film, 2 a hot melt type adhesive, 3 a metal foil, 3' a heat-sealable adhesive, 14 a flange portion, 15 a recess for packaging the contents, 16 a gap which is created by the movement of the circumference of two blank portions of the metal foil, 17 a heat-sealable adhesive layer, 18 a metal foil and 19 the contents.

Although, only the production of the body of a moisture-proof container having two recesses for packaging the contents is explained in the process of the present invention, the number of the recess is not so limited and thus a large number of recesses, for example, 100 or more recesses can be formed in the body of the moisture-proof container for packaging contents.

As explained above, since the metal foil is not broken according to the process of the present invention, the body of the container is moisture-proof. Therefore, a completely moisture-proof container having two or more recesses for packaging the contents can be made by adhering a moisture-proof lid to the body of container, or by adhering one body of the container to another equivalent body of said container. According to the present invention, therefore, it is possible to obtain a container for packaging which requires a remarkable moisture-proofness for packaging medical tablets, foods and superfine machine parts.

The present invention is illustrated by the following examples which do not limit the present invention.

EXAMPLE 1

15 g/m$^2$ of hot melt adhesive consisting of ethylene-vinyl acetate copolymer having a softening point of 60°–70°C. were coated on hard polyvinyl chloride film having the thickness of 150 $\mu$ and then the coated hard polyvinyl chloride film was adhered with a soft aluminum foil having the thickness of 60 $\mu$. The surface of the aluminum foil of the laminated sheet consisting of three layers which was made above is coated with a heat-sealable lacquer of vinyl chloride-vinyl acetate type and thereafter only the aluminum foil was cut so as to form two circular blank portions having a diameter of 24 mm respectively.

Using a die having the internal diameter of 12.6 mm and a punch having the external diameter of 12.0 mm, the above laminated sheet was positioned between the die and the blank holder which is heated by the heating device as shown in FIG. 5. The temperature of the die was maintained at a temperature of less than 50°C. The punch was pressurized into the die as shown in FIG. 6 thereby the blank portions of the laminated sheet were stretch-formed to give two recesses having a depth of 5 mm respectively. As a result, the external diameter of the blank portions of the soft aluminum foil was draw-formed to the external diameter of 14 mm and also the hard polyvinyl chloride film was stretch-formed.

EXAMPLE 2

The soft aluminum foil having the thickness of 50 $\mu$ was used in place of the aluminum foil of Example 1 and was adhered on the polyvinyl chloride film having the thickness of 30 $\mu$ by using a saturated polyester isocyanate type adhesive instead of the heat-sealable lacquer of Example 1. Thereafter the hard polyvinyl chloride film having the thickness of 150 $\mu$ was adhered on the surface of the soft aluminum foil by using the hot melt type adhesive of Example 1 to form a laminated sheet. Both the polyvinyl chloride film having the thickness of 30 $\mu$ and the soft aluminum foil having the thickness of 50 $\mu$ were only cut to form circular blank portions having the diameter of 24 mm. The blank portions of the laminated sheet was stretch-formed as shown in Example 1. A similar result was as shown in Example 1.

What is claimed is:

1. A process for manufacturing a body of a moisture-proof container having at least two recesses for packaging purposes which comprises adhering a metal foil to a thermoplastic resin film with a hot melt type adhesive to form a laminated sheet, forming at least two closed blank portions in said laminated sheet by cutting only the metal foil, and stretch-forming said closed blank portions of the laminated sheet at a temperature wherein the hot melt type adhesive and the thermoplastic resin film are softened thereby forming said recesses.

2. A process as claimed in claim 1 wherein the thermoplastic resin film is a film selected from the group consisting of polyvinyl chloride, polyethylene, polypropylene, a polyester and a polycarbonate.

3. A process as claimed in claim 1, wherein the thickness of the thermoplastic resin film is 100 – 500 $\mu$.

4. A process as claimed in claim 1 wherein the metal foil is a film selected from the group consisting of aluminum, tin, copper and iron.

5. A process as claimed in claim 4 wherein the thickness of the metal foil is 30 – 150 $\mu$.

6. A process as claimed in claim 4, wherein the thickness of the metal foil is 40 – 70 microns.

7. A process as claimed in claim 1 wherein the hot melt type adhesive comprises a resin, selected from the group consisting of ethylene-vinylacetate copolymer, polyvinyl acetate, polyvinyl-butyral, polyethylene and a polyamide as a main component and an ester gum, rosin, or paraffin as an additive.

8. A process as claimed in claim 7, wherein the thickness of the hot melt type adhesive is 10 – 15 microns.

9. A process as claimed in claim 7 wherein the thickness of the hot melt type adhesive is 3 – 30 $\mu$.

10. A process as claimed in claim 1, wherein the thickness of the thermoplastic resin film is 150–300 microns.

11. A process as claimed in claim 1, wherein the thickness of the thermoplastic resin film is 150–200 microns.

12. A process as claimed in claim 1, wherein the recesses are covered with a metal foil containing a heat-sealable adhesive layer.

13. A process as claimed in claim 1, wherein the recesses are covered with a mirror image of said moisture-proof container.

14. A process as claimed in claim 1, wherein another thermoplastic resin film is adhered to one surface of the metal foil before it is cut and then cutting only said another thermoplastic resin film and the metal foil.

* * * * *